(12) United States Patent
Roeder et al.

(10) Patent No.: US 12,401,522 B1
(45) Date of Patent: Aug. 26, 2025

(54) DECENTRALIZED SOCIAL NETWORK SYSTEMS AND METHODS

(71) Applicant: FUTO Holdings Inc., Austin, TX (US)

(72) Inventors: Harpo Roeder, Austin, TX (US); Eron Jokipii, Austin, TX (US); Koen Jeukendrup, Eindhoven (NL); Kelvin Keultjes, Eindhoven (NL)

(73) Assignee: FUTO Holdings Inc., Austin, TX (US)

( * ) Notice: Subject to any disclaimer, the term of this patent is extended or adjusted under 35 U.S.C. 154(b) by 278 days.

(21) Appl. No.: 18/363,943

(22) Filed: Aug. 2, 2023

(51) Int. Cl.
*H04L 9/32* (2006.01)
*H04L 9/30* (2006.01)

(52) U.S. Cl.
CPC .......... *H04L 9/3247* (2013.01); *H04L 9/3073* (2013.01); *H04L 9/3297* (2013.01)

(58) Field of Classification Search
CPC .... H04L 9/3247; H04L 9/3297; H04L 9/3073
USPC ........................................................ 713/170
See application file for complete search history.

(56) References Cited

U.S. PATENT DOCUMENTS

| | | | |
|---|---|---|---|
| 9,419,854 B1 | 8/2016 | Wang | |
| 9,692,815 B2 | 6/2017 | Caldwell | |
| 9,830,333 B1 | 11/2017 | Wisniewski | |
| 11,388,120 B2 | 7/2022 | Cohen | |
| 2008/0148054 A1* | 6/2008 | Cahill | G06F 21/64 713/180 |
| 2012/0109830 A1* | 5/2012 | Vogel | G06Q 30/06 705/64 |
| 2016/0378737 A1 | 12/2016 | Keslin | |
| 2016/0381099 A1 | 12/2016 | Keslin | |
| 2017/0078384 A1 | 3/2017 | Trandafir | |
| 2018/0219685 A1* | 8/2018 | Deery | H04L 9/3247 |
| 2019/0036932 A1* | 1/2019 | Bathen | H04L 63/0428 |
| 2019/0179806 A1* | 6/2019 | Reinsberg | H04L 9/3297 |
| 2020/0127828 A1* | 4/2020 | Liu | H04L 9/30 |
| 2020/0169425 A1* | 5/2020 | Hofstee | H04L 9/0861 |
| 2020/0304498 A1 | 9/2020 | Buchner | |
| 2021/0184845 A1* | 6/2021 | Hébert | H04L 9/3239 |
| 2021/0234849 A1 | 7/2021 | Lamb | |
| 2021/0377254 A1* | 12/2021 | Avetisov | H04L 67/133 |

(Continued)

OTHER PUBLICATIONS

Sruthi Sree Kumar, "Vector Clocks" May 17, 2020 (Year: 2020).*

(Continued)

*Primary Examiner* — Samson B Lemma
(74) *Attorney, Agent, or Firm* — Law Office of Andrei D Popovici, PC

(57) ABSTRACT

A decentralized social network architecture allows reliable, multi-device, censorship-resistant distribution of messages. Network messages include a profile ID identifying a cryptographic public key, a device ID identifying a device used by the profile, a payload, a vector clock for the profile including a scalar for each device used by the profile, a real-time timestamp, and a message signature generated with the cryptographic private key counterpart of the public key. The signature authenticates each message as a self-contained entity, without cryptographic reference to previous messages. A user profile can employ multiple, independent server(s) for message distribution, and can add and remove servers from its distribution network. Security is provided in a decentralized manner via public key cryptography and a decentralized web of trust.

16 Claims, 14 Drawing Sheets

(56) References Cited

U.S. PATENT DOCUMENTS

| | | |
|---|---|---|
| 2022/0263754 A1 | 8/2022 | Tracy |
| 2023/0028555 A1 | 1/2023 | Cameron |
| 2023/0033192 A1 | 2/2023 | Sutherland |
| 2024/0171377 A1* | 5/2024 | Fields ................ G06Q 20/3829 |

OTHER PUBLICATIONS

Ronald L. Rivest, "SPKI/SDSI 2.0 A Simple Distributed Security Infrastructure" MIT Lab for Computer Science, 1996.*
Scuttlebutt, Scuttlebutt Protocol Guide, downloaded from https://ssbc.github.io/scuttlebutt-protocol-guide/ on Apr. 11, 2023.
Wikipedia, Mastodon (Social Network), downloaded from https://en.wikipedia.org/wiki/Mastodon_(social_network) on Apr. 11, 2023.
Wikipedia, Keybase, downloaded from https://en.wikipedia.org/wiki/Keybase on Apr. 11, 2023.

* cited by examiner

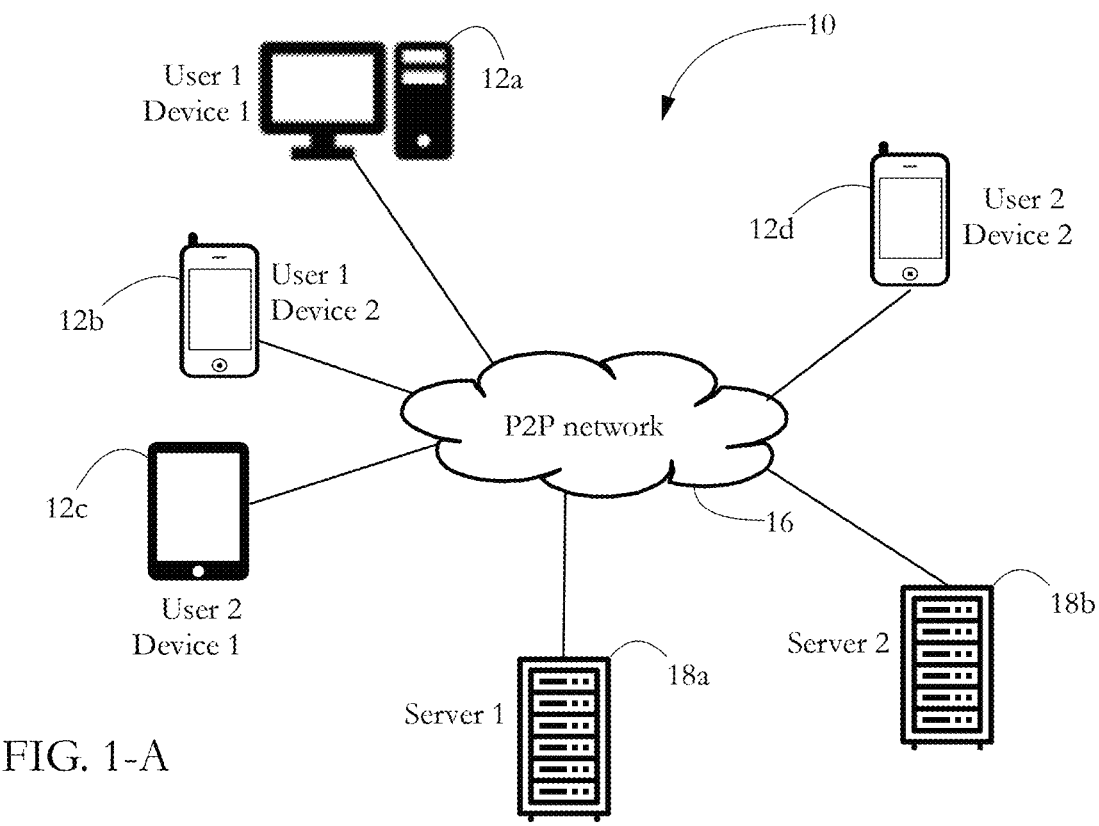
FIG. 1-A
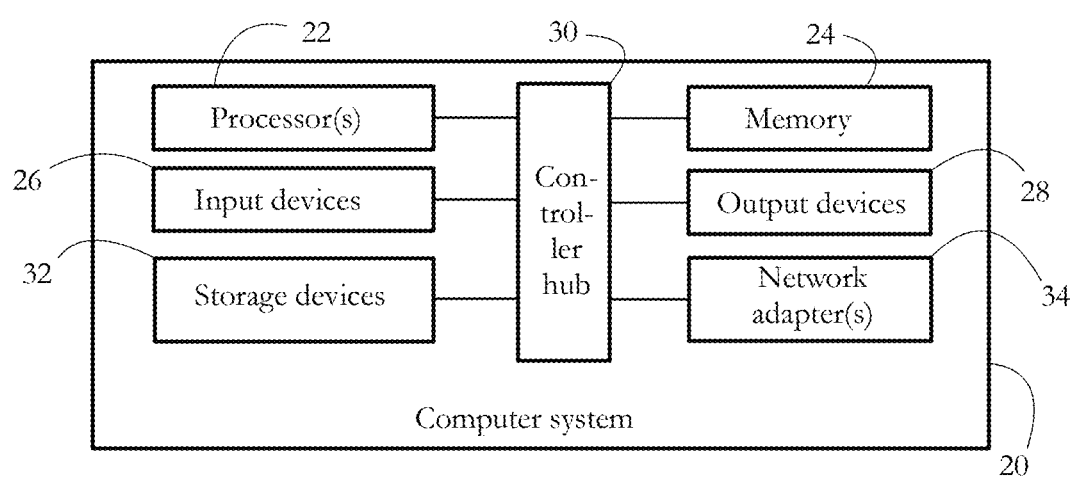
FIG. 1-B

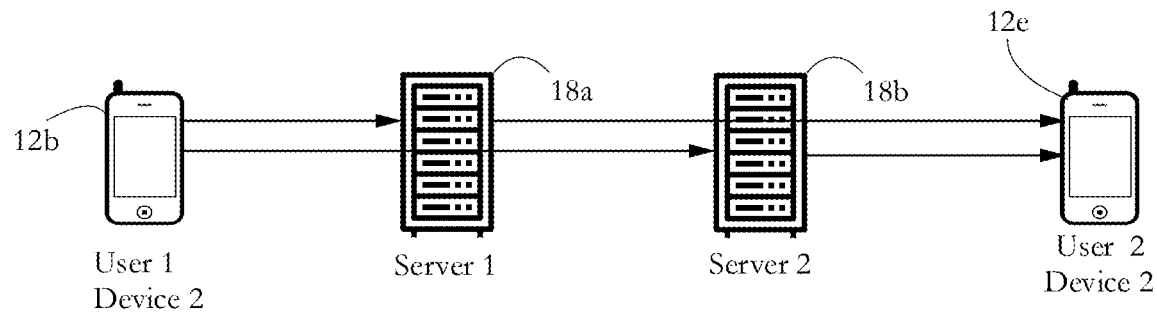
FIG. 2-A
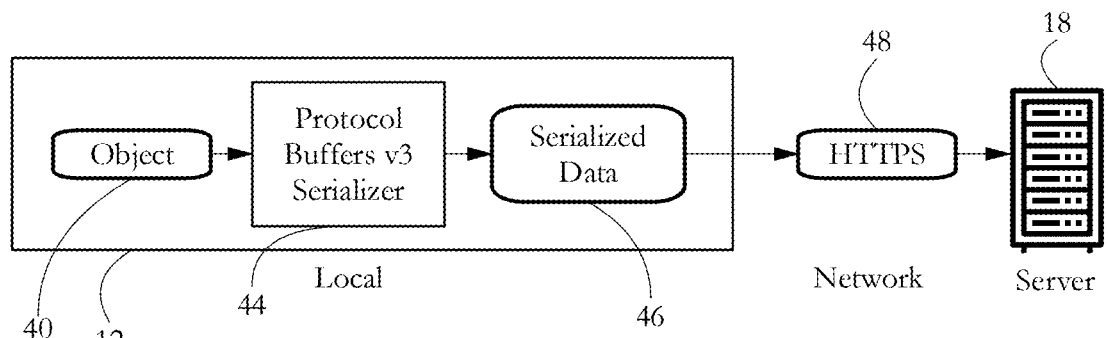
FIG. 2-B
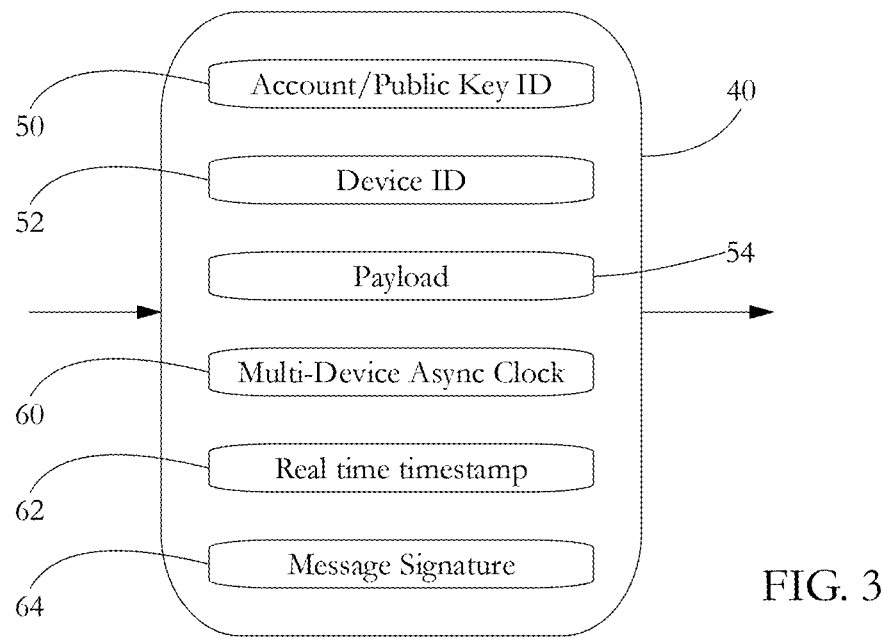
FIG. 3

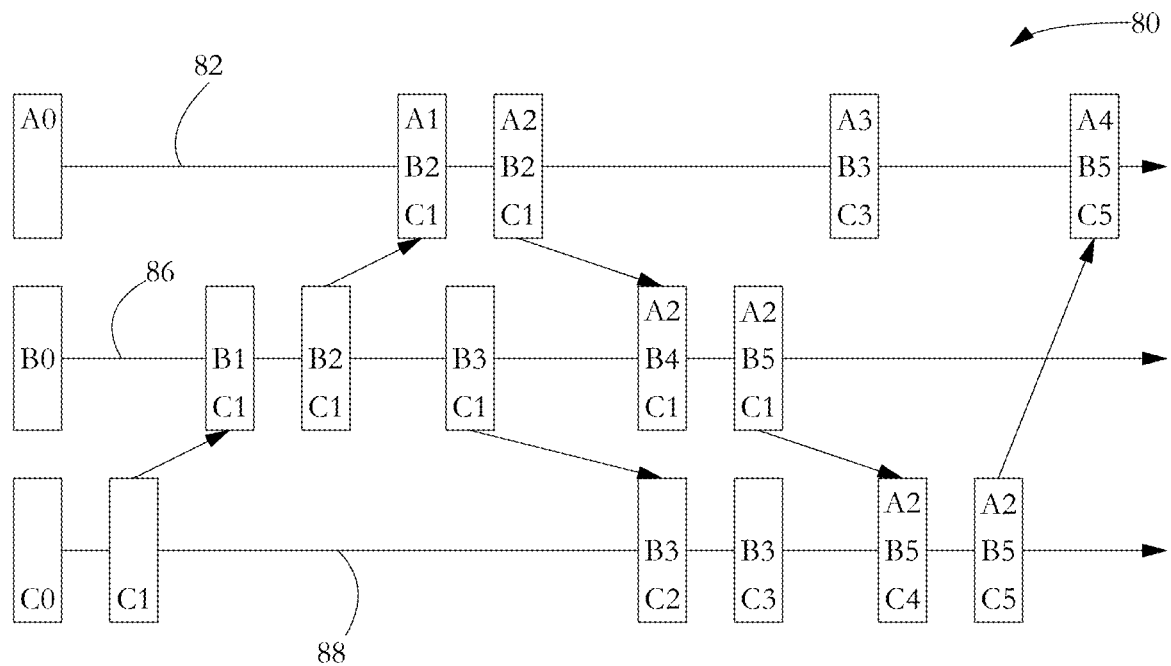
FIG. 4-A
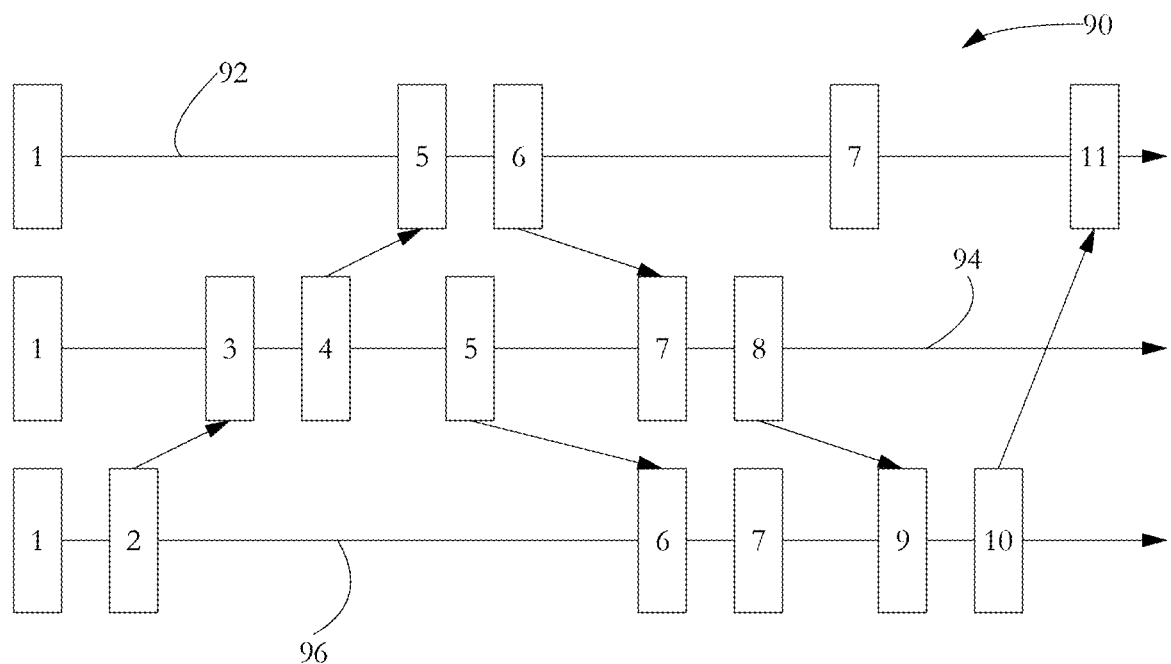
FIG. 4-B

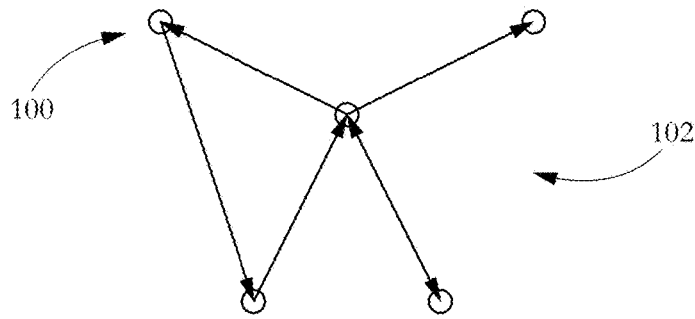

FIG. 5

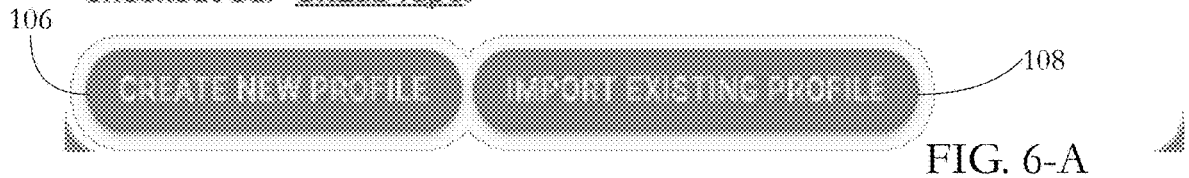

Welcome to Polycentric

Polycentric is a distributed Open-source Social Network with cryptographic sovereign identities. Content lives on multiple servers chosen by the identity owner.

Your client will automatically download content from the servers it lives on. Data is cryptographically integrity checked to ensure servers are not modifying, or hiding messages from users. Data is offline first, allowing offline browsing, and offline posting.

Start by creating a new identity, or importing an existing identity. Your browser may ask you for permission to store data locally. There are no usernames or passwords. You may login on a different device by exporting, and then importing your profile.

Polycentric is currently in development. Incompatible changes may be made, and your profile may not be usable forever. For more information checkout our GitLab repo.

FIG. 6-A

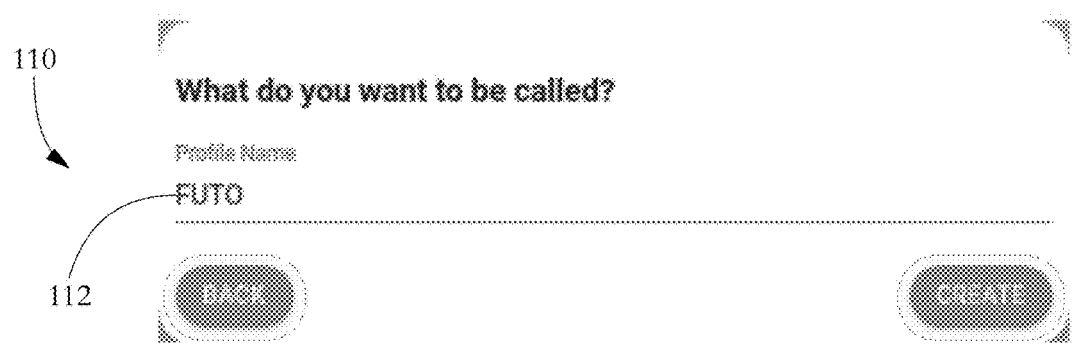
FIG. 6-B
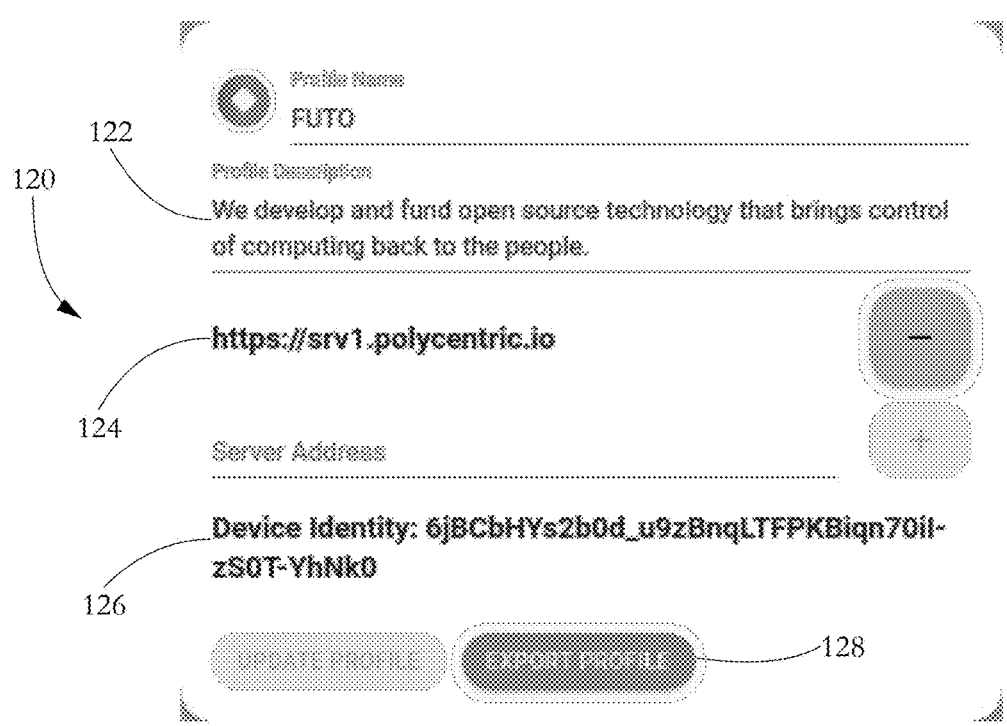
FIG. 6-C

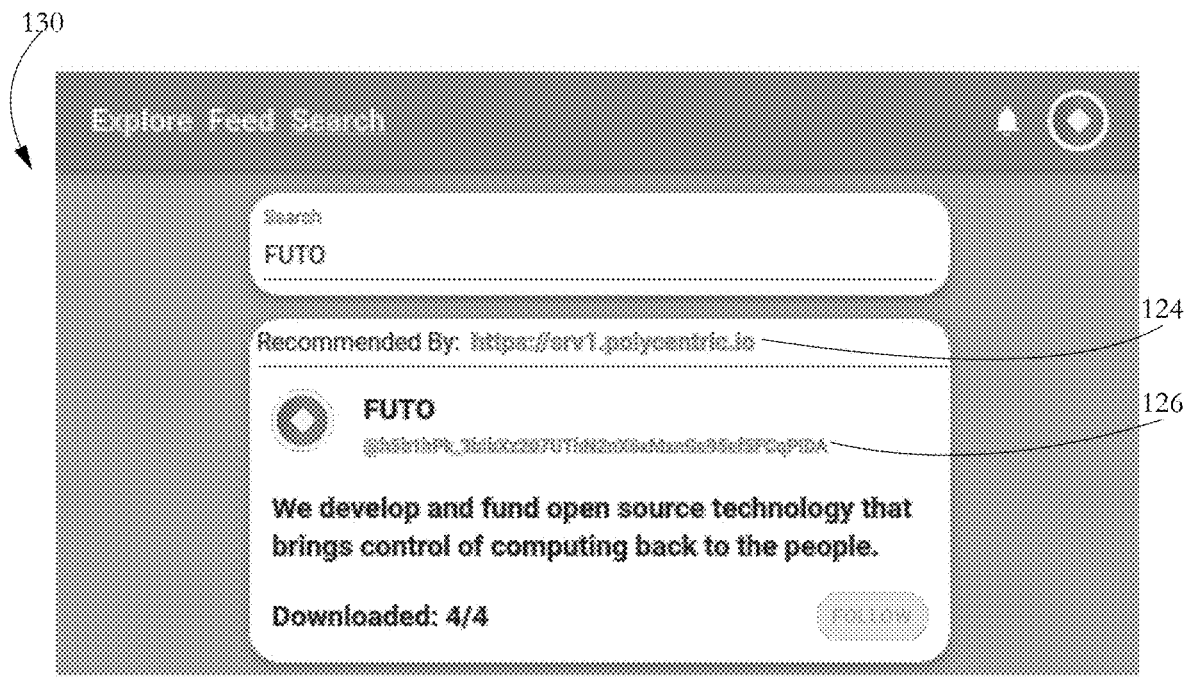
FIG. 6-D
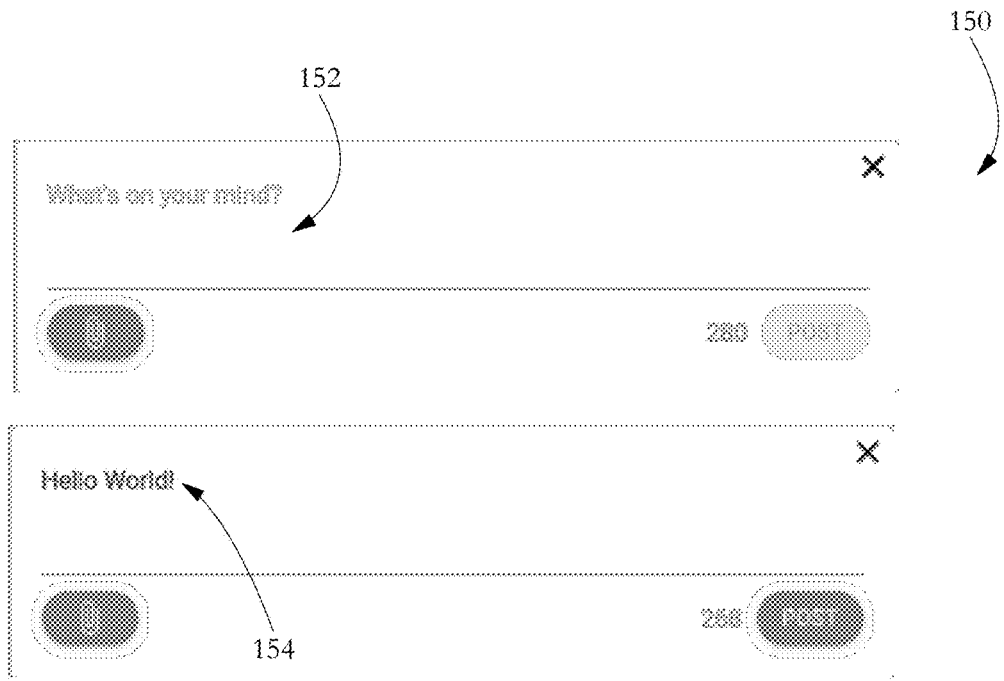
FIG. 6-E

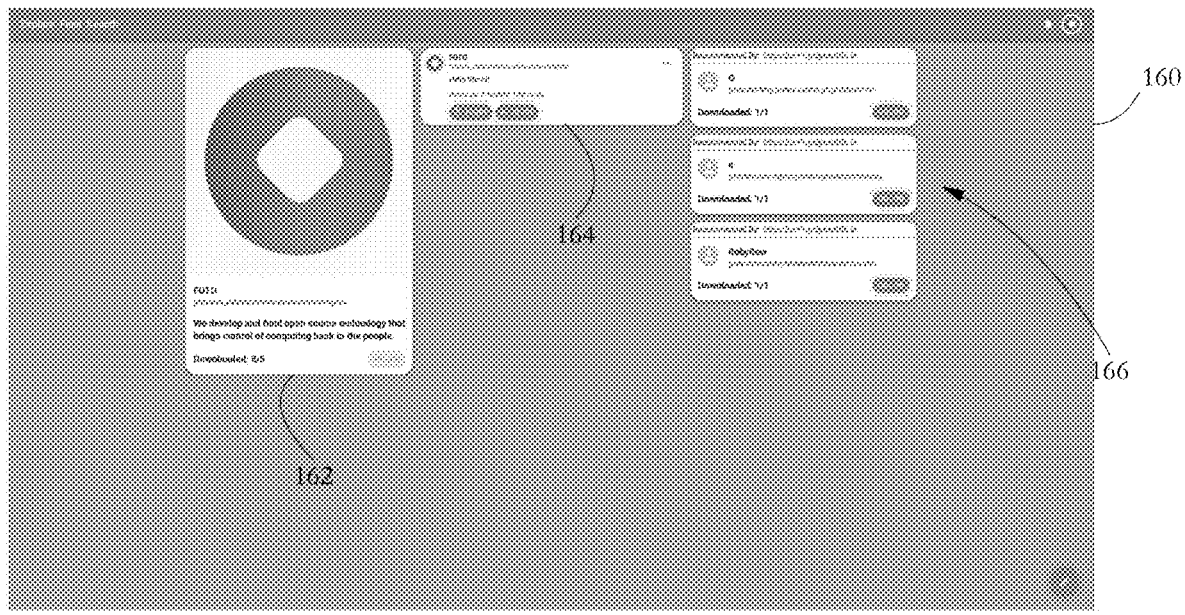
FIG. 6-F
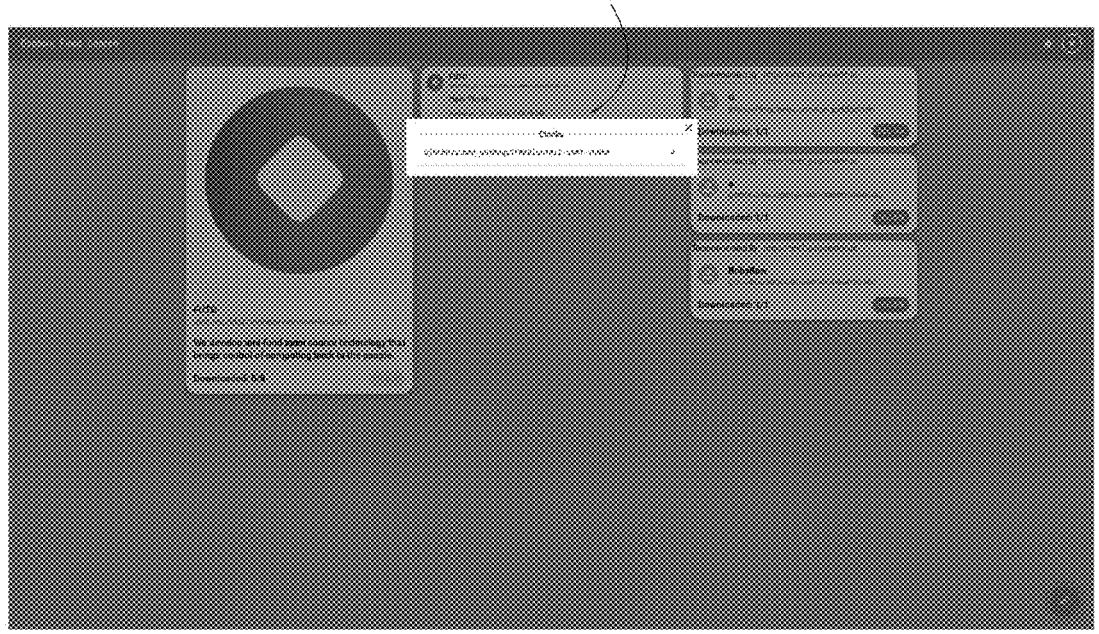
FIG. 6-G

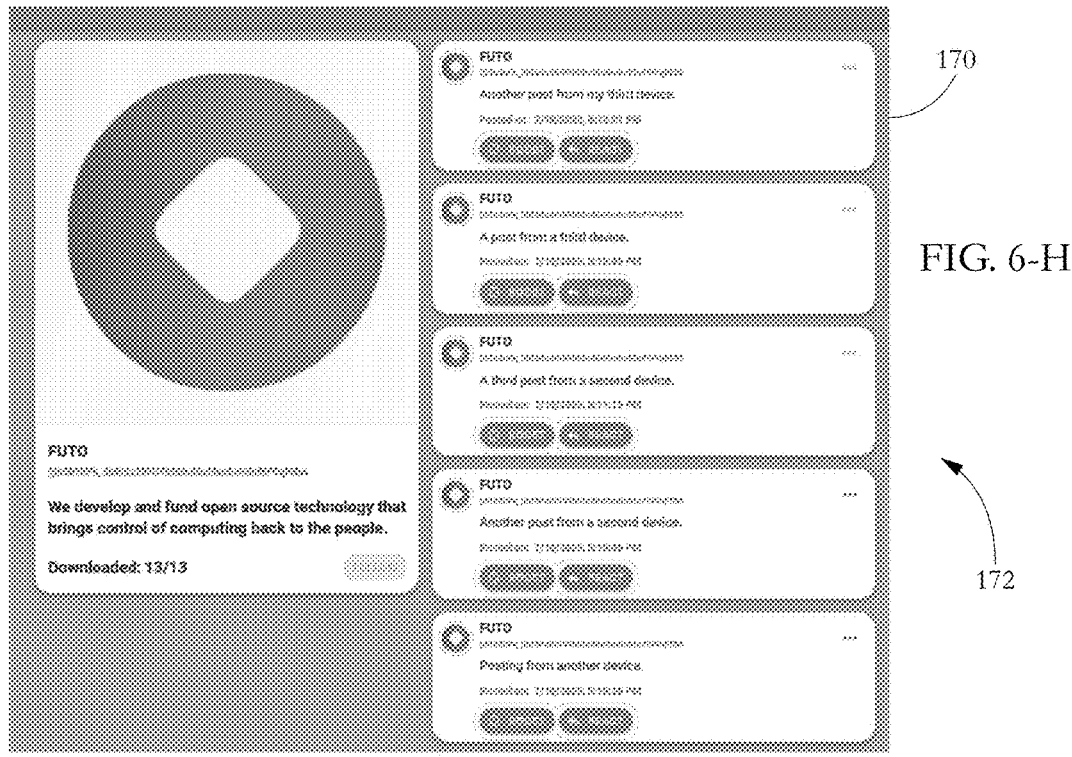
FIG. 6-H
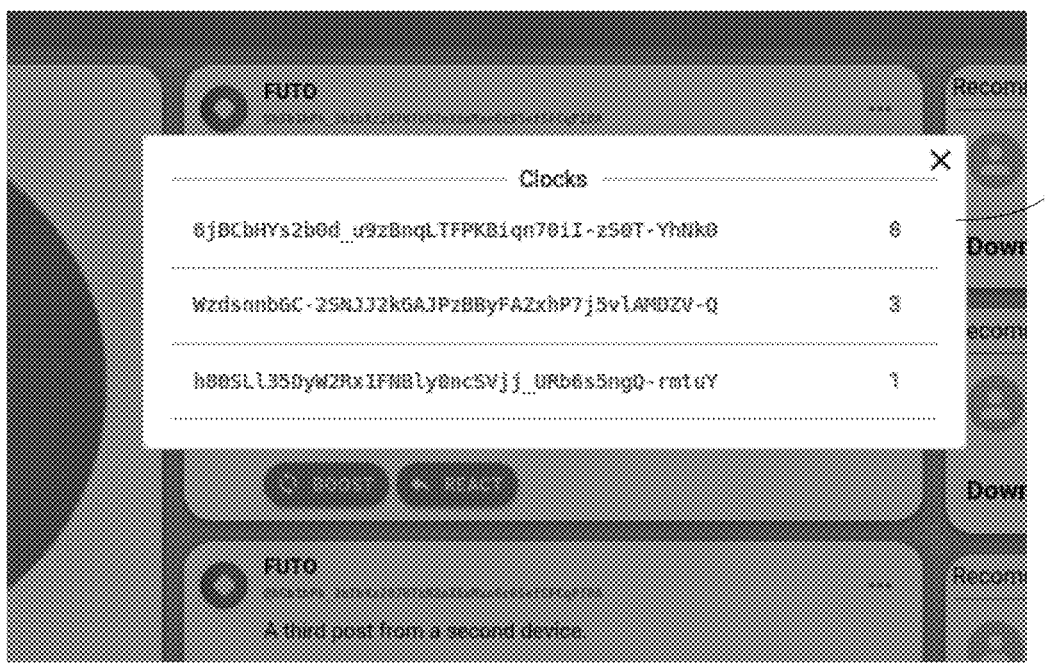
FIG. 6-I

FIG. 6-J
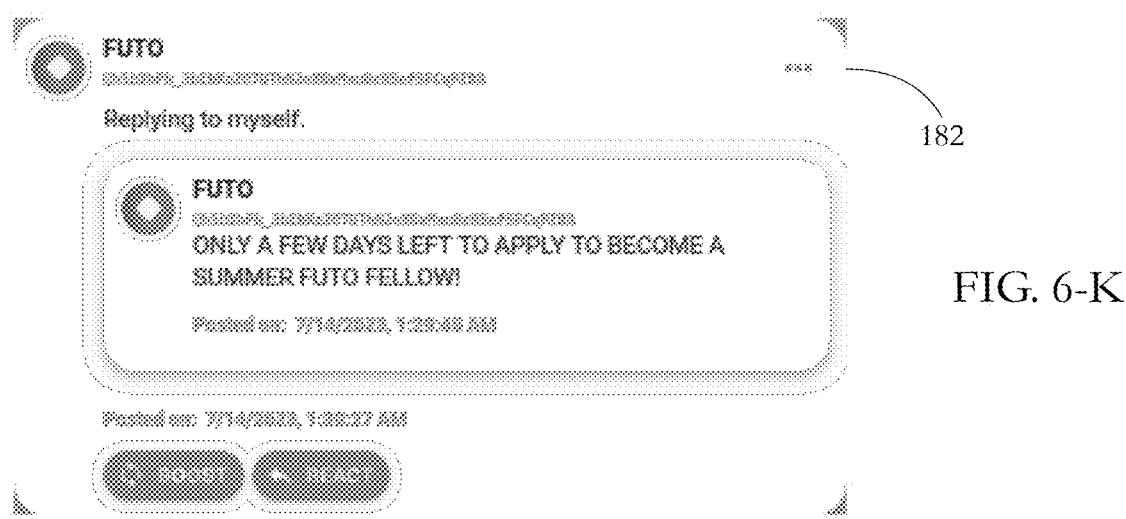
FIG. 6-K
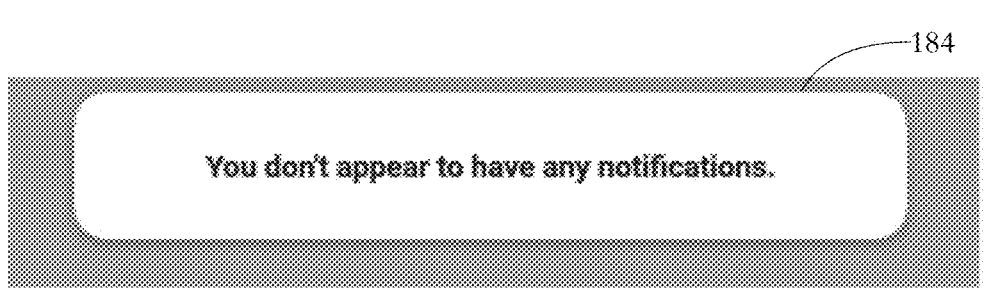
FIG. 6-L

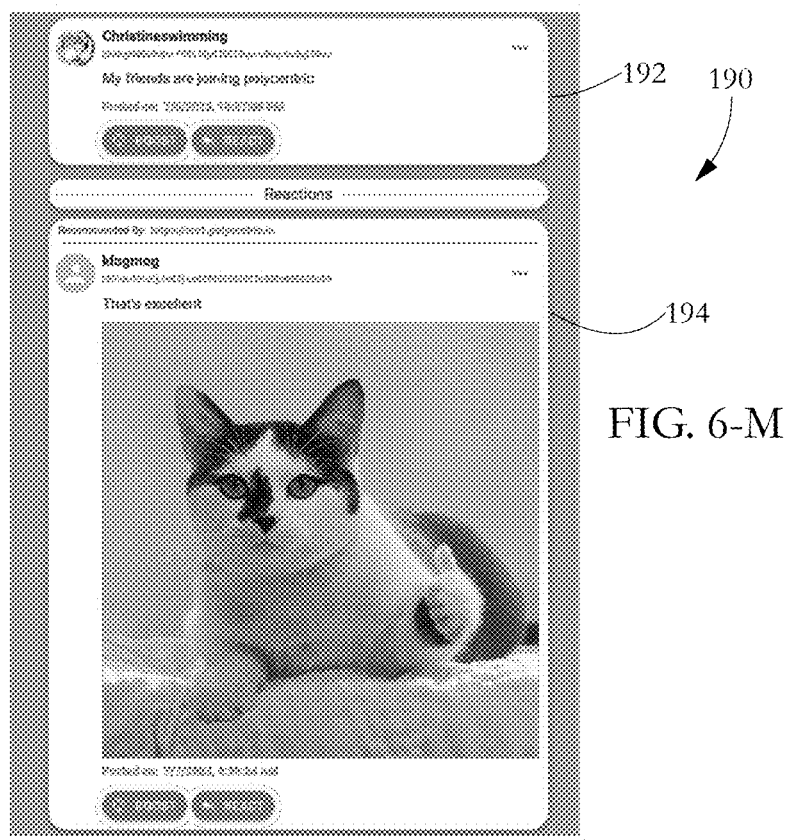
FIG. 6-M
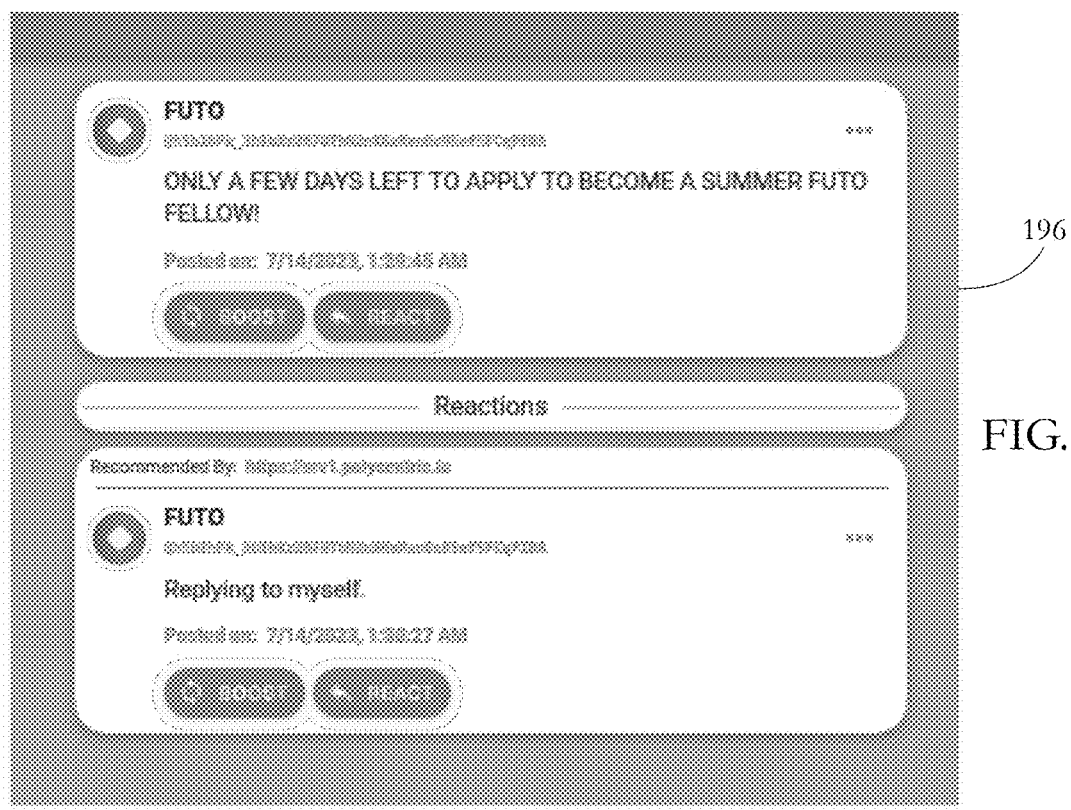
FIG. 6-N

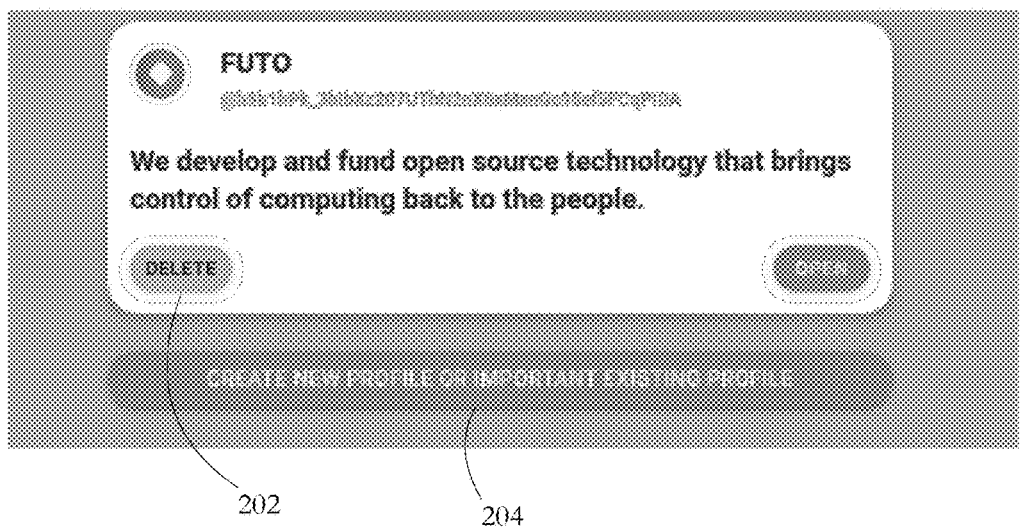
FIG. 6-O
FIG. 6-P

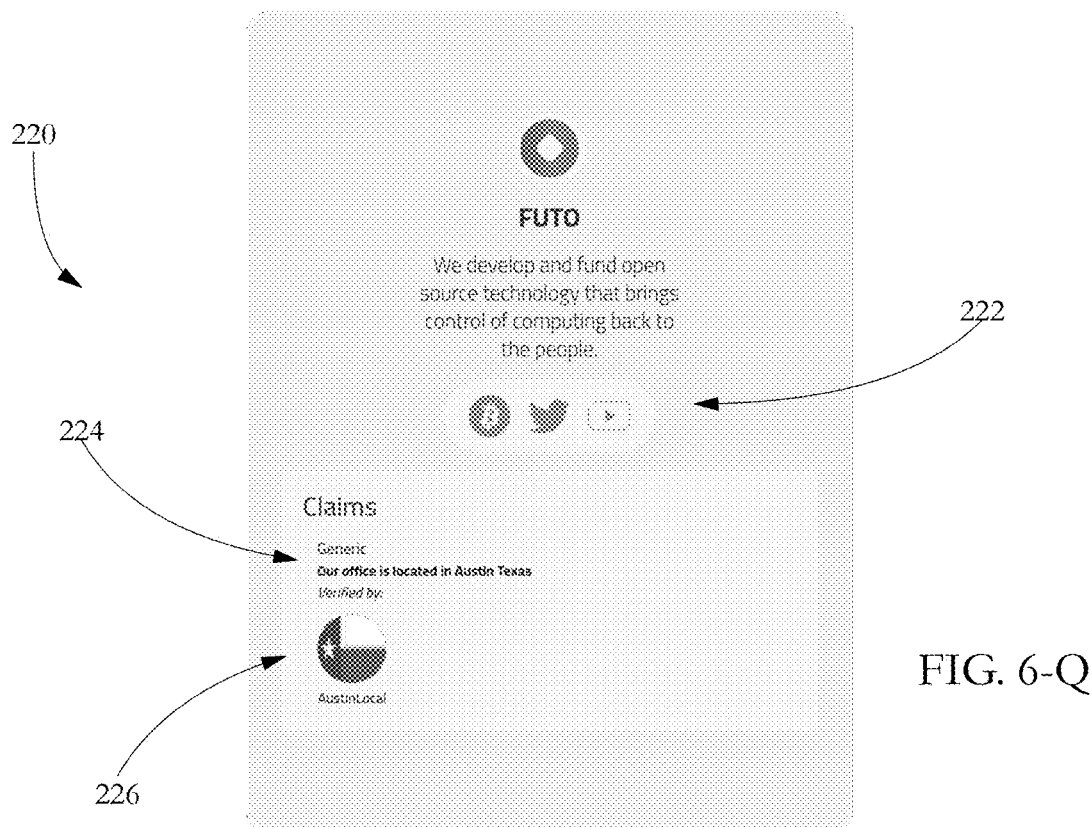
FIG. 6-Q
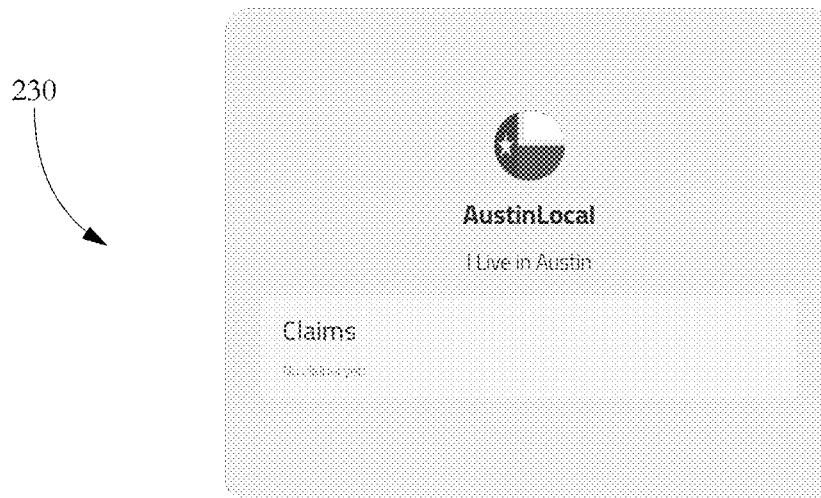
FIG. 6-R

DECENTRALIZED SOCIAL NETWORK SYSTEMS AND METHODS

BACKGROUND

The invention relates to decentralized social networks.

The current large social networks rely on centralized servers to maintain and distribute data. Centralized servers maintain client data and a social graph defining connections between clients and content items. Centralization facilitates ease of use for a number of reasons, including low latency, and the presence of a single trusted authority (the social network operator) capable of resolving competing claims and banning malicious actors such as bots. At the same time, centralized systems are subject to relatively unfettered control by the operator, including on matters of censorship, and more broadly content suppression and amplification.

Federated social network systems, such as systems built on open-source Mastodon software, have gained customer traction in response to increasing dissatisfaction with the content management practices of centralized social network operators. In such a federated system, each user is a member of a specific Mastodon server, which can interoperate with other servers. While federated systems reduce the censorship power of any given server operator, different servers can still ban each other, and user profiles are generally tied to specific servers.

Decentralized networks provide at least the promise of increased user control and decreased vulnerability to censorship and/or centralized control of content amplification and suppression. At the same time, distributed systems face a number of practical challenges, including higher latency, maintaining consistent states across different parts of the system, resolving competing claims, and more generally how to deal with potentially-malicious actors in environments with no single trusted authority.

SUMMARY

According to one aspect, a method comprises employing at least one hardware processor of a computer system to receive a first social network message from a first device in a decentralized social network, and assemble a second social network message for posting on the decentralized social network. The first message includes a first user profile identifier identifying a public key of a public/private key pair of a first user profile, the first device being assigned to the first user profile; a first device identifier identifying the first device; a first content payload including social networking post content; a vector clock state for the first user profile, the vector clock state comprising a plurality of scalar values, each scalar value characterizing a device assigned to the first user profile; and a message signature generated by signing the first message using a private key of the public/private key pair of the first user profile. The second social network message includes a second user profile identifier identifying a public key of a public/private key pair of a second user profile, the computer system being assigned to the second user profile; a second device identifier identifying the computer system; a second content payload including social networking post content; a vector clock state for the second user profile, the vector clock state comprising a plurality of scalar values, each scalar value characterizing a device assigned to the second user profile; and a message signature generated by signing the second message using a private key of the public/private key pair of the second user profile.

According to another aspect, a computer system comprises at least one hardware processor programmed to receive a first social network message from a first device in a decentralized social network, and assemble a second social network message for posting on the decentralized social network. The first message includes a first user profile identifier identifying a public key of a public/private key pair of a first user profile, the first device being assigned to the first user profile; a first device identifier identifying the first device; a first content payload including social networking post content; a vector clock state for the first user profile, the vector clock state comprising a plurality of scalar values, each scalar value characterizing a device assigned to the first user profile; and a message signature generated by signing the first message using a private key of the public/private key pair of the first user profile. The second social network message includes a second user profile identifier identifying a public key of a public/private key pair of a second user profile, the computer system being assigned to the second user profile; a second device identifier identifying the computer system; a second content payload including social networking post content; a vector clock state for the second user profile, the vector clock state comprising a plurality of scalar values, each scalar value characterizing a device assigned to the second user profile; and a message signature generated by signing the second message using a private key of the public/private key pair of the second user profile.

According to another aspect, a non-transitory computer-readable medium stores instructions which, when executed by at least one hardware processor of a computer system, cause the computer system to receive a first social network message from a first device in a decentralized social network, and assemble a second social network message for posting on the decentralized social network. The first message includes a first user profile identifier identifying a public key of a public/private key pair of a first user profile, the first device being assigned to the first user profile; a first device identifier identifying the first device; a first content payload including social networking post content; a vector clock state for the first user profile, the vector clock state comprising a plurality of scalar values, each scalar value characterizing a device assigned to the first user profile; and a message signature generated by signing the first message using a private key of the public/private key pair of the first user profile. The second social network message includes a second user profile identifier identifying a public key of a public/private key pair of a second user profile, the computer system being assigned to the second user profile; a second device identifier identifying the computer system; a second content payload including social networking post content; a vector clock state for the second user profile, the vector clock state comprising a plurality of scalar values, each scalar value characterizing a device assigned to the second user profile; and a message signature generated by signing the second message using a private key of the public/private key pair of the second user profile.

BRIEF DESCRIPTION OF THE DRAWINGS

The foregoing aspects and advantages of the present invention will become better understood upon reading the following detailed description and upon reference to the drawings where:

FIG. 1-A shows an exemplary set of client and server devices forming at least part of a peer-to-peer social network according to some embodiments of the present invention.

FIG. 1-B shows an exemplary hardware configuration of a computer system programmable to carry out methods according to some embodiments of the present invention.

FIG. 2-A illustrates an exemplary flow of data between two client devices according to some embodiments of the present invention.

FIG. 2-B illustrates local data serialization according to some embodiments of the present invention.

FIG. 3 shows a set of fields of an exemplary peer-to-peer social network message according to some embodiments of the present invention.

FIG. 4-A illustrates an exemplary sequence of vector clock states according to some embodiments of the present invention.

FIG. 4-B shows an exemplary sequence of Lamport timestamps according to some embodiments of the present invention.

FIG. 5 shows an exemplary web (graph) comprising entities (user profiles/identities) as nodes and trust/recommendation relationships as edges interconnecting nodes according to some embodiments of the present invention.

FIG. 6-A shows an exemplary profile-creation graphical user interface configuration according to some embodiments of the present invention.

FIG. 6-B shows an exemplary graphical user interface configuration for receiving user input setting a user profile name according to some embodiments of the present invention.

FIG. 6-C shows an exemplary display resulting from a creation of a user profile according to some embodiments of the present invention.

FIG. 6-D shows an exemplary display of a peer-to-peer social network post according to some embodiments of the present invention.

FIG. 6-E shows an exemplary composition display before and after receiving user input composing a text post according to some embodiments of the present invention.

FIG. 6-F shows an exemplary profile overview display according to some embodiments of the present invention.

FIG. 6-G shows an exemplary display of a single-device vector clock state according to some embodiments of the present invention.

FIG. 6-H shows an exemplary profile overview display including posts generated via three devices belonging to a user profile according to some embodiments of the present invention.

FIG. 6-I shows an exemplary three-device vector clock state characterizing the display of FIG. 6-H according to some embodiments of the present invention.

FIG. 6-J shows a graphical user interface configuration for receiving user input to delete a post and display debug information according to some embodiments of the present invention.

FIG. 6-K shows an exemplary reply post according to some embodiments of the present invention.

FIG. 6-L shows an exemplary notification display according to some embodiments of the present invention.

FIG. 6-M shows an exemplary image reply post according to some embodiments of the present invention.

FIG. 6-N shows an exemplary text reply post according to some embodiments of the present invention.

FIG. 6-O shows an exemplary display of profile and device information according to some embodiments of the present invention.

FIG. 6-P shows an exemplary display including a field configured to receive user input for creating a new profile and/or importing an existing profile according to some embodiments of the present invention.

FIG. 6-Q shows an exemplary display of a claim verified by a node in a web of trust according to some embodiments of the present invention.

FIG. 6-R shows an exemplary display of an empty claims field of a node in a web of trust according to some embodiments of the present invention.

DETAILED DESCRIPTION OF PREFERRED EMBODIMENTS

Figure 7:
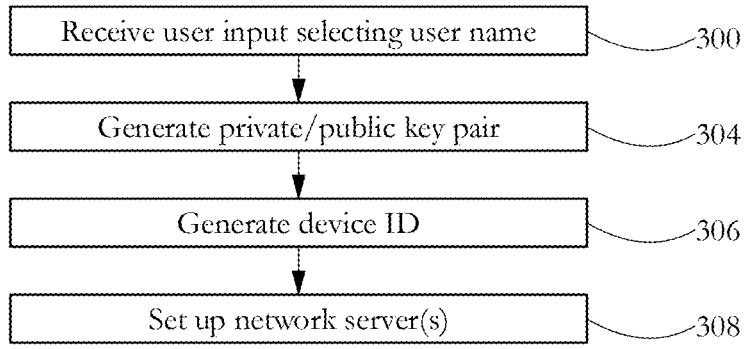
FIG. 7 shows an exemplary sequence of steps performed to create a new user profile/identity according to some embodiments of the present invention.

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. A wide area network includes at least one router. The term database is used herein to denote any organized collection of data. Signing a message encompasses signing the entire contents of a message or at least part of the contents of the message to identify the source of the message. Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

FIG. 1 illustrates a peer-to-peer, decentralized social network 10 comprising a plurality of client/user devices 12a-d and a plurality of servers 18a-b, all interconnected through a peer-to-peer (P2P) network 16. Exemplary client devices 12a-d include personal computer systems, mobile computing platforms (e.g., laptop computers, tablets, mobile telephones), entertainment devices (e.g., TVs, game consoles), wearable devices (e.g., smartwatches, fitness bands), and any other electronic devices comprising a processor, memory, and communication interface enabling the respective device to communicate with other devices/computer systems. Any exemplary client device 12a-d may request access to a remote content server 18a-b over a communication link, to exchange data such as web content, electronic messages, documents, etc. P2P network 16 may include at least parts of a local area network (LAN) and/or a wide area network (WAN) such as the Internet.

FIG. 2 shows an exemplary hardware configuration of a computer system 20, which may be a client device 12a-d or server 18a-b. Computer system 20 comprises a set of physical devices, including a hardware processor 22 and a memory 24. Processor 22 comprises a physical device (e.g. a microprocessor, a multi-core integrated circuit formed on a semiconductor substrate, etc.) configured to execute computational and/or logical operations with a set of signals and/or data. In some embodiments, such operations are delivered to processor 22 in the form of a sequence of processor instructions (e.g. machine code or other type of encoding). Memory 24 may comprise computer-readable media (e.g. DRAM, SRAM) storing instructions and/or data accessed or generated by processor 22. Input devices 26 may include computer keyboards, mice, and microphones, among others, including the respective hardware interfaces and/or adapters allowing a user to introduce data and/or instructions into the respective computer system. Output devices 28 may include display devices such as monitors and speakers among others, as well as hardware interfaces/adapters such as graphic cards, allowing the illustrated computing appliance to communicate data to a user. In some embodiments, input devices 26 and output devices 28 share a common piece of hardware, as in the case of touch-screen devices. Storage devices 32 include computer-readable media enabling the storage, reading, and writing of software instructions and/or data. Exemplary storage devices 32 include magnetic and optical disks and flash memory devices, as well as removable media such as CD and/or DVD disks and drives. The set of network adapters 34, together with associated communication interface(s), enables the illustrated computer system to connect to a computer network such as P2P network 16 (FIG. 1) and/or to other devices/computer systems. Controller hub 30 generically represents the plurality of system, peripheral, and/or chipset buses, and/or all other circuitry enabling the communication between processor 22 and devices 24, 26, 28, 32, and 34. For instance, controller hub 30 may include a memory controller, an input/output (I/O) controller, and an interrupt controller, among others. In another example, controller hub 30 may comprise a northbridge connecting processor 22 to memory 24, and/or a southbridge connecting processor 22 to devices 26, 28, 32, and 34.

Each client 12 runs a decentralized social network client application executing functions as described herein, and each server 18 runs a decentralized social network server application executing functions as described herein. In some embodiments, some clients 12 run in-browser applications, while other clients 12 run standalone applications. An in-browser application may employ persistent storage provided by the browser, and creating and using a user profile in an in-browser application may include configuring the browser to permit persistent storage of user profile data connected to a particular server address. Messages are communicated via a set reconciliation protocol, and state is constructed by clients consuming system events under an eventual consistency model.

FIG. 2-A illustrates an exemplary flow of data between two exemplary client devices 12b, 12-e according to some embodiments of the present invention. When a client device 12b of a first user profile generates a post, the post is uploaded to a set of independent servers 18a-b chosen by the first user for hosting content generated by the user's profile and devices. Servers 18a-b may be hosted on different, independently-controlled physical machines and/or different Internet domains, in particular different top- and second-level domains (TLDs and SLDs). In the example srv1.polycentric.io, ".io" denotes the TLD, and "polycentric" denotes the SLD. Hosting content on multiple independent servers improves system resiliency: in the event of a profile ban or content suppression by one server, content generated by the user account will remain available on other servers.

A client device 12e of a second user profile will download the post via synchronization with one or both of servers 18a-b. In this example, the second user profile follows (i.e. is subscribed to) the first user profile, and client device 12e includes a subscription data structure identifying servers (including servers 18a-b) and user profiles (including the first user profile) subject to synchronization. In some embodiments, when a user profile subscribes to another user profile, the subscriber devices begin downloading the followed user profile's entire content over time. In some embodiments, only content meeting predetermined conditions (e.g. most recent content) is downloaded initially, with additional content downloads requiring additional user input.

Data synchronization is ongoing, and may be performed at predetermined intervals and/or in response to the occurrence of certain events. In some embodiments, synchronization is initiated by each client device 12 at a predetermined interval having a value between 1 second and 2 minutes, for example every 20 to 40 seconds, more specifically every 30 seconds, for each user profile identified as a followed profile in the subscription data structure. Synchronization is also attempted/performed at application startup, and in response to user input initiating a profile update activity such as a posting activity. In some embodiments, synchronization may involve push actions as well, for example in response to activities such as feed updates performed by followed profiles.

In some embodiments, synchronization is performed between corresponding data structures including conflict-free replicated data types (CRDTs) maintained on clients 12 and servers 18. CRDTs are data structures that are replicated across multiple computers in a network. An application, for example a distributed social network application running on a client 12 as described herein, can update any one copy (replica) of a given data type independently, concurrently and without coordinating with other copies (replicas). Any inconsistencies between copies are automatically resolved by an algorithm directly controlling the CRDT, which is transparent to the application(s) writing to the CRDT. CRDT states across replicas eventually converge, even though state values may be different across copies (replicas) at a given point in time, for example immediately following update of one copy. In some embodiments, suitable CRDTs for at least some fields include Last-Write-Wins Element (LWW Element) CRDTs. For example, if different devices set a profile/user name, the last one wins. In other instances, other CRDT types may be used. For example, when performing a merge operation between the data of multiple devices, the deletion of a feed post by any one device may be used to control the merge operation (i.e. a feed post is considered deleted if any device has deleted the post).

FIG. 2-B illustrates local data serialization according to some embodiments of the present invention. An object (message) 40 assembled by a client 12 for communication is processed by a serializer 44 to generate serialized data 46, which is then transmitted as encrypted (e.g. https) packets over a network to a server 18. In some embodiments, serializer 44 implements a binary serialization protocol such as Protocol Buffers (ProtoBuf), e.g. Protocol Buffers v3, available as open source software. Serialization facilitates the transfer of object 40 over a network. In some embodiments, other formats/syntaxes, such as JSON or XML, may be used in conjunction with and/or instead of a binary serialization protocol in order to structure messages.

FIG. 3 shows a set of fields of an exemplary peer-to-peer social network message 40 according to some embodiments of the present invention. Message 40 includes a profile/public key ID field 50, a device ID field 52, a payload field 54, a multi-device asynchronous clock field 60, a real-time timestamp field 62, and a message signature field 64. In some embodiments, not all messages include all the fields shown in FIG. 3, and some or all messages may include additional fields than the ones illustrated.

The profile/public key ID field 50 uniquely identifies a user profile and its uniquely-associated public key for a private-public key pair. The private-public key pair is generated at profile setup and assigned to the user profile as described below. The private key is held privately and locally by the user on one or more client devices, while the public key is used to publicly identify the user profile. Public key cryptography, sometimes termed asymmetric cryptography, is known in the field. As a skilled artisan would appreciate, the private key may be used to decrypt a message encrypted with its corresponding public key. The private key may also be used to sign a given message, and a member of the public can use the corresponding public key to verify that the message has been signed with the corresponding private key, thus confirming that the signer is the holder of the private key corresponding to the public key. Public key cryptosystems including algorithms for key generation and digital signing, such as RSA, are widely publicly available. In some embodiments, the profile/public key ID may be or include the public key itself. In some embodiments, the profile/public key ID may be a pointer or reference to the public key in a public key directory or other key repository allowing retrieval of the public key as indexed by the pointer/reference.

Device ID field 52 comprises a random or pseudo-random string used to identify different devices belonging to a given user profile/public key ID. Device ID field 52 may be constrained to have a predetermined, fixed length (e.g. a value between 8 or 64 bytes, for example 16 bytes).

Payload field 54 contains a payload including user-generated social media post content such as text, image, and/or video content. Payload field 54 may include multiple subfields, each constrained to predetermined maximum sizes. Suitable such subfields may include text, image, and video subfields. For example, a text subfield may be constrained to a size corresponding to 280 characters, or some other character limit.

Multi-device asynchronous clock field 60 stores an asynchronous clock state for the user profile. In some embodiments, asynchronous clock field 60 stores a vector clock state comprising a scalar value for each device belonging to the user profile. Exemplary vector clock states are shown in FIGS. 6-G and 6-I, and described in further detail with reference to FIG. 4-A. In some embodiments, asynchronous clock field 60 may include a set of Lamport timestamps, each characterizing a state of a device belonging the user profile. Lamport timestamps are described below with reference to FIG. 4-B. Asynchronous clock field 60 facilitates mixed online and offline use of multiple physical devices belonging to a user profile. For example, a phone belonging to a user profile may be in use while temporarily offline, while a laptop belonging to the same user profile is online and capable of receiving and sending data. In such a scenario, asynchronous clock field 60 facilitates synchronization and eventual convergence of the states of the different devices as devices come online, as explained below.

Real-time timestamp field 62 stores a real-time clock (RTC) value characterizing a date and time of an initiation/assembly of the message. The real time may be expressed as an date-hour-minute-second value of a 24-hour clock with respect to a given timezone (e.g. GMT). The real time value may be retrieved from a network time server responsive to network time protocol (ntp) queries, and/or from a real time clock maintained by the client system generating the corresponding message 40. Real-time timestamps may be useful in assembling a user's profile timeline in chronological order, particularly in situations in which certain devices belonging to the user profile are in use offline for a certain period, or more generally situations in which multiple message streams generated by different devices are integrated into a single user profile stream/timeline.

Message signature field 64 contains a signature of message 40, generated using the private key corresponding to the public key identified by the profile/public key ID field 50. The message signature held by message signature field 64 can be used to authenticate message 40 as generated by the user profile identified by profile/public key ID field 50. The message signature signs message 40 as a self-contained event, without cryptographic reference(s) to previous messages in a chain. In other words, the contents and/or signatures or previous messages are not required to generate a message signature. Self-contained, individual message signing allows the deletion of messages while maintaining the validity of the remaining messages. By contrast, in blockchain systems in which each message signature cryptographically references previous signed messages, deletion of a link in the blockchain would affect (i.e. destroy the validity of) all subsequent links in the chain.

In some embodiments, a server may expose different API endpoints for different API calls. In some embodiments, available API call types include Events, Head, Ranges, ResolveClaim, and SearchQuery.

Events calls/endpoints are used to read/write identified events (messages). The messages may be identified via the corresponding user profile, device and vector clock scalar (counter) for that device. A Head call is used to request the latest event (message) for a given user profile, which includes the latest vector clock state for the user profile as maintained by the queried server. Such a call may be used to assess whether the requester and/or the server's data for the given user profile are up to date. A Ranges call is used to request the range(s) of events/messages maintained by the queried server for the user profile. The range(s) may be represented as available scalar values for each device assigned to the user profile. A requester client may subtract the ranges it already has from the ranges available by the server to determine which messages of the given user profile are not already in possession of the requester client, and then to request the missing messages using an Events call.

A ResolveClaim call may be used to resolve/confirm a claim, such as an ownership claim regarding an online asset, as described below. The response to a ResolveClaim call includes one or more messages including signed declarations of trust/recommendations maintained as a web of trust, described below (e.g. A states X, B trusts/recommends A, etc.).

A SearchQuery call may be used to query the recipient server for user profiles and/or messages that meet search query criteria. The recipient server maintains one or more periodically-updated indexes relating user profile and message identifiers to the content of user profiles and/or messages, and uses the index(es) to respond to search queries. The recipient server may choose the ordering of query responses according to its own criteria. In some embodiments, a user profile may use multiple servers for each server, with the results deduplicated and attributed to the providing server on the client side. The use of multiple servers for queries reduces user vulnerability to malicious behavior by any one server.

In some embodiments, a LinkPost data structure may be used to post structured links to user profiles on external platforms such as websites or social media page. A LinkPost message is hosted outside the distributed social network, but readable by distributed social network clients. A LinkPost message includes a user profile public key or public key identifier, and identifiers of one or more servers that host that user profile's content.

In some embodiments, a user profile may include in its feed/timeline certain data that is not structured as a message as described above. For example, each user profile feed advertises the addresses of one or more servers that serve the content of that user profile feed.

FIG. 4-A illustrates an exemplary sequence 80 of vector clock states according to some embodiments of the present invention. Sequence 80 includes three subsequences 82, 86, 88, each characterizing one device of three devices belonging to a user profile. As shown, each device (A, B or C) starts with an initial device count (e.g. zero, denoted as A0, B0, and C0, respectively), which is incremented each time an event (e.g. transmission, reception or internal event) occurs on the corresponding device. When a message is transferred from one device to another, a vector clock including the sender's device stored clock state is transferred along with the message. The receiver device then updates its stored vector clock by comparing its stored scalar values to the corresponding received scalar values, and setting its updated scalar value to the larger value identified by the comparison. For example, when the device B sends a vector clock state of (A2, B5, C1) to the device C, the device C generates an updated vector clock state (A2, B5, C4) by performing three scalar comparisons: the received value A2 is chosen over the local blank, the received value B5 replaces the local value B3, and the local value C3 is incremented to C4 (the received value C1 is disregarded). Thus, while the vector clock states maintained by different devices diverge temporarily, the states get updated with new state information as devices exchange messages and vector clock states.

FIG. 4-B shows an exemplary sequence 90 of Lamport timestamps according to some embodiments of the present invention. Sequence 90 includes three subsequences 92, 94, 96, each characterizing one device of three devices belonging to a user profile. As illustrated, each of the three devices maintains an event counter having a single (scalar) value. When a message and associated counter value are received, the local counter value is updated to the greater of the values resulting from incrementing the local counter and incrementing the received counter value. For example, when the first device (characterized by subsequence 90) receives a message with a counter value of 4, the first device updates its local counter from 1 to 5 (4+1). Lamport timestamps provide an indication that events have been occurring on other devices belonging to a user profile, but do not provide the same ability to request and reconstruct missing messages as the more-detailed vector clock exchanges illustrated in FIG. 4-A.

In some embodiments, each decentralized social network user profile/identity can post messages recommending/declaring trust in other user profile/identities. Each trust/recommendation declaration is implemented through a corresponding signed message. FIG. 5 illustrates an exemplary web (graph) of trust comprising entities (user profiles/identities) as nodes 100 and trust/recommendation relationships as edges 102 interconnecting nodes 100, according to some embodiments of the present invention. Edges have directions denoting the direction of trust/recommendation. As illustrated, a graph need not have a root node, though some graphs may include a root node and have a tree structure terminating in leaf nodes. In a simple embodiment, a two-node graph includes one node recommending/declaring trust in another.

In some embodiments, the web of trust of FIG. 5 may be stored as a plurality of overlapping graph data structures stored by different nodes. In some embodiments, each node stores only the nodes/edges that it directly recommends/trusts, or that contribute directly to its own assessments of trust. In some embodiments, each node may also store nodes/edges that contribute indirectly to its own assessments of trust. In particular, in some embodiments a client device stores only a list of trusted user profiles, while a server stores a more complex graph data structure characterizing all trust declarations between user profiles using that server.

In some embodiments, the web of trust may be used to display direct and optionally indirect trust relationships. In some embodiments, each server identifies only the direct donors of trust to a given node subject to a query. Indirect trust relationships may then be identified via following trust declarations up the chain. For example, a query to a server for user profile A may return a response "user profile B recommends user profile A," and a separate query to a server for user profile B may then return a response "user profile C and server D recommend profile B."

In some embodiments, such a web of trust may be used by client and/or server-side message display prioritization logic serving a given user profile. For example, a given user may select to prioritize messages with certain trust characteristics (e.g. higher trust scores) over messages with other trust characteristics. User-controlled logic running on a server for that user profile may be used to prioritize high-trust messages for display in the user profile's feed/timeline.

In some embodiments, such a web of trust may be used to verify/resolve claims external to the distributed social network, in particular claims of ownership of user identities/profiles outside the distributed social network, such as accounts on social or other media platforms such as Twitter or Youtube. For example, a given user profile and/or server may publish a structured message stating that "John Johnson is the owner of the Johnson Family Youtube channel." A query to a server of the distributed social network, in particular to a server for the given user profile, asking for an identification of the owner of the Johnson Family Youtube channel would then return an answer conveying that "John Johnson is the owner of the Johnson Family Youtube channel; John Johnson is recommended by Jack Smith and the Polycentric Server; Jack Smith is recommended by the Polycentric Server." Each distributed social network server may maintain a database/index of external user identities/profiles subject to ownership claims via messages on the distributed social network. Each server then uses that database/index, in conjunction with ownership claim messages posted on the distributed social network and web of trust data to respond to queries regarding the ownership of external user identities/profiles.

FIG. 6-A shows an exemplary profile-creation graphical user interface (GUI) configuration 104 according to some embodiments of the present invention. A profile-creation graphical element 106 is configured to receive user input (e.g. a mouse click) initiating a workflow that results in the creation of a new user profile and associated data, including a public/private cryptographic key pair. A profile-import graphical element 108 is configured to receive user input initiating a workflow that results in the importation of profile data of an existing user profile, including the public and private keys of the profile, and generates a new device ID for the device hosting the illustrated GUI.

FIG. 6-B shows an exemplary graphical user interface configuration 110 for receiving user input setting a user profile/identity name according to some embodiments of the present invention. Configuration 110 is displayed in response to user input initiating the creation of a new user profile, received using graphical element 102 (FIG. 6-A). A profile/identity name input field 112 is configured to receive text user input (e.g. a typed string) defining a human-oriented profile/identity name/handle, "FUTO" in the illustrated example). In some embodiments, since there is no authoritative central authority, multiple user profiles may use the same handle, and web of trust data may be used to convey to users which of multiple handles is trusted.

FIG. 6-C shows an exemplary display 120 resulting from a creation of a new user profile according to some embodiments of the present invention. A profile name and profile description display 122 is co-displayed with a server address field 124 displaying one or more Internet address(es) of server(s) used by the profile/identity to send/receive messages, and with a device ID field 126 displaying the local device ID generated as part of the profile creation process. Server address field 124 includes GUI elements (illustrated as + and − signs in FIG. 6-C) configured to receive used input initiating a deletion and addition, respectively, or server addresses registered for the profile. Adding and removing server addresses used/registered for a profile comprises changing a local data structure storing registered server addresses. In some embodiments, a server does not require any registration procedure in order to accept messages for distribution. In some embodiments, a server may require profile registration prior to accepting messages from a profile. A profile registration procedure may include imposing conditions on user profiles, such a solving CAPTCHAs, verifying that the user profile is not listed on a maliciousness blacklist, and/or requiring payment.

FIG. 6-D shows an exemplary display of a peer-to-peer social network post 130 according to some embodiments of the present invention. The post content (text and/or image) is co-displayed with a host server address field 124 and a profile/public key identifier 126.

FIG. 6-E shows an exemplary composition display 150 before and after receiving user input composing a text post according to some embodiments of the present invention. A post-composition field 152 is configured to receive user input composing a text posting. The result of receiving exemplary user input ("Hello World!") is shown at 154. Composition display 150 may include a counter showing the number of available characters for the post (280 initially, 268 subsequently in FIG. 6-E).

FIG. 6-F shows an exemplary profile overview display 160 according to some embodiments of the present invention. Display 160 includes a user profile/identity field 162 co-displayed with a posting field 164 and a recommended profile/post field 166. Posting field 164 includes a Boost field configured to receive user input boosting (re-posting) the selected post. Boosting a selected post is achieved by creating a boost/report message including a pointer to the boosted/reposted message.

FIG. 6-G shows an exemplary display 168 of a single-device vector clock state according to some embodiments of the present invention. The vector clock state may be exposed by receiving user input selecting a Debug action on a GUI element displayed as part of a post. The vector clock state corresponding to that post is then displayed as shown. The scalar count of 4 reflects one timeline/feed post and messages that perform other profile actions. Examples of such actions include setting a profile name, setting a profile description, and advertising one or more new servers for the user profile.

FIG. 6-H shows an exemplary profile overview display 170 including posts generated via three devices belonging to a user profile according to some embodiments of the present invention. As shown, a sequence of posts 172 composed and posted on different devices are co-displayed on the user profile page, without distinction between the various devices.

FIG. 6-I shows an exemplary three-device vector clock state display 178 characterizing the display of FIG. 6-H according to some embodiments of the present invention. Display 178 is exposed in response to receiving user input selecting a Debug action on a corresponding post shown in FIG. 6-H.

FIG. 6-J shows a graphical user interface configuration 180 for receiving user input to delete a post and display debug information according to some embodiments of the present invention. In response to user input requesting deletion of the message, a new message indicating the deletion of the original message is generated. As a result, the original message is totally deleted, first on the requesting device and then on others via synchronization. The vector clock scalar for the deleted message is unchanged.

User input requesting a display of debug information results in a display of a vector clock state as shown in FIG. 6-I. User input requesting a deletion of a post results in the deletion of the post from the local client data structure. The deletion is then propagated through synchronization to the server(s) used by the user profile.

FIG. 6-K shows an exemplary reply post 182 according to some embodiments of the present invention. The illustrated reply post replies to an original post of the same user profile. A similar display may be used for replies to a different user's posts. A reply post, like a report, includes a pointer to the replied-to message.

FIG. 6-L shows an exemplary notification display 184 according to some embodiments of the present invention. Notification display 184 informs the user that there are no notifications to display. Other notification displays may inform the user of events such as mentions in other users' posts, new followers, new boosts, and new replies.

FIG. 6-M shows an exemplary image reply post 190 according to some embodiments of the present invention. A reply post 194 including an image and text is co-displayed along with an original post 192. FIG. 6-N shows an exemplary text reply post 196 according to some embodiments of the present invention. A text reply is co-displayed along with an original post. A reply message includes a field referencing the previous (replied-to) message as an original message.

FIG. 6-O shows an exemplary display 200 of profile and device information according to some embodiments of the present invention. Display 200 may be generated in response to user input selecting a profile information display command on a user profile screen. The illustrated information indicates that the client is a web browser, that the client browser is storing persistent information. The illustrated information also shows estimates of the total storage used and available to the user profile on the local client.

FIG. 6-P shows an exemplary display including delete post field 202 co-displayed alongside an import field 204 configured to receive user input for creating a new profile and/or importing an existing profile according to some embodiments of the present invention. In response to user input selecting importing a new profile, new user profile information is imported from a local or remote source. The new user profile information includes the public and private keys of the new user profile. A new device ID is then generated for the new user profile and the current local device.

FIG. 6-Q shows an exemplary display 220 of a claim 224 verified by a node in a web of trust according to some embodiments of the present invention. Display 220 may include an off-platform identity field 222 showing links to various off-platform accounts/identities of the same user. In the illustrated example, such identities may include Bitcoin, Twitter and Youtube identities. A claim verification display 226 shows a user identity that has verified the relevant claim. In the illustrated example, the profile with handle Austin-Local has verified the claim by the profile with handle FUTO that "Our office is located in Austin, Texas."

FIG. 6-R shows an exemplary display 230 of an empty claims field of a node in a web of trust according to some embodiments of the present invention. In the illustrated display, the profile with handle AustinLocal has made no claims.

FIG. 7 shows an exemplary sequence of steps performed to create a new user profile/identity according to some embodiments of the present invention. In a step 300, an application running on a client device receives user input selecting a candidate user name/handle for a user profile. The application may include components executing on a browser, such as Javascript and/or browser plugin code, and/or a standalone application distinct from a browser. The client application is capable of communicating with at least one P2P social network distribution server, as described below.

In a step 304, the client application and/or connected server(s) generate a new cryptographic public/private key pair to be assigned to the user profile. Generating cryptographic public/private key pairs is known in the art. In some embodiments, the key pair generation may include a Curve 25519 algorithm using a 256-bit key size. Curve 25519 is designed for use with the elliptic curve Diffie-Hellman (ECDH) key agreement scheme. In some embodiments, the key generation process may include multiple algorithms/key generation approaches.

In a step 306, the client application and/or connected server(s) generate a device ID to be assigned to the client device performing the sequence of steps. The device ID may be a random or pseudo-random string as described above.

In a step 308, one or more network servers are identified and configured to recognize and transmit information to/from the client device. Step 308 may include transmitting to the identified server(s) the user profile and device IDs, as well as the public key described above. In some embodiments, step 308 may include publishing a message announcing that the user account is using the identified server for message distribution.

Figure 8:
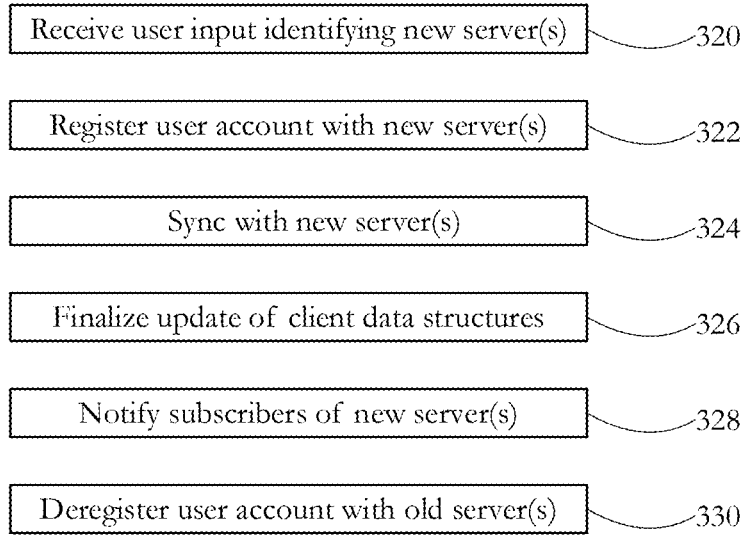
FIG. 8 shows an exemplary sequence of steps performed to assign one or more new servers to a user profile according to some embodiments of the present invention.

FIG. 8 shows an exemplary sequence of steps performed to assign one or more new servers to a user profile according to some embodiments of the present invention. In a step 320, a client device receives user input identifying one or more new server(s), as illustrated in FIG. 6-C.

In a step 322, the client registers the new profile with the new server(s). The profile registration procedure includes sending a registration request signed using the profile's private key to the new server(s). The registration request includes the profile's public key and device identifier(s). The server(s) verify the new profile eligibility for registration and register the profile if eligible. In some embodiments no registration is required, and a server simply receives new messages for distribution from any user profile.

In a step 324, the profile performs an initial synchronization process with the new server(s). The initial synchronization process replicates data structures defining the profile state (minus private key) from the client device and/or existing server(s) to the new server.

In a step 326, client-side data structures are updated to reflect the addition/substitution of the new server(s) for use by the user profile.

In a step 328, subscribers/followers of the user profile are notified of the new servers. The notification may be performed using the normal synchronization procedure used by the subscriber profiles. If a server has banned the user profile, subscribers may be notified of any new server(s) via off-network communications. The impact of a server ban is mitigated by the ability of user profiles to designed multiple servers, such that in the event of a server ban, the identities of new servers announced by the user profile via messages are propagated to subscribers by remaining servers.

In a step 330, the user profile is deregistered with the old server(s), if appropriate, by sending a deregistration message signed with the user profile's private key. The deregistration action is then propagated through the normal synchronization procedure used by subscriber profiles.

Figure 9:
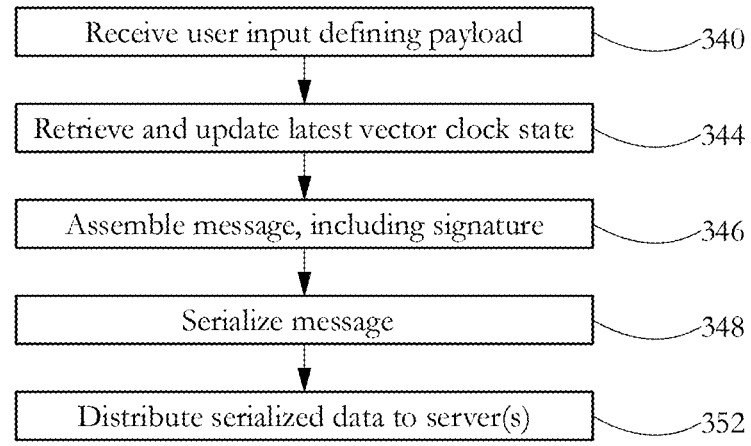
FIG. 9 shows an exemplary sequence of steps performed to post/distribute a message according to some embodiments of the present invention.

FIG. 9 shows an exemplary sequence of steps performed to post/distribute a message according to some embodiments of the present invention. In a step 340, a client device receives user input defining a post's payload, as shown in FIG. 6-E. The post may be an initial post or a reply/reaction post linked to a previous post of the same profile or a different profile.

In a step 344, the client device retrieves and updates the user profile's vector clock state. Retrieving the vector clock state may include synchronizing the vector clock state with that stored on one or more servers associated with the user profile. Updating the user profile's vector clock state may include reconciling any differences between the current vector clock state stored by the device with the vector clock state received via synchronization, for example by choosing each final scalar to be the maximum of the local and remote values for that scalar. The local device scalar is further updated by incrementing its value by one, reflecting the upcoming/pending post.

In a step 346, a message including fields as shown in FIG. 3 is assembled. The message includes a signature of the message using the user profile's private key. In a step 348, the assembled message is serialized as described with reference to FIG. 2-B. In a step 352, the serialized message is distributed to one or more distribution servers 18 (shown in FIG. 1).

Figure 10:
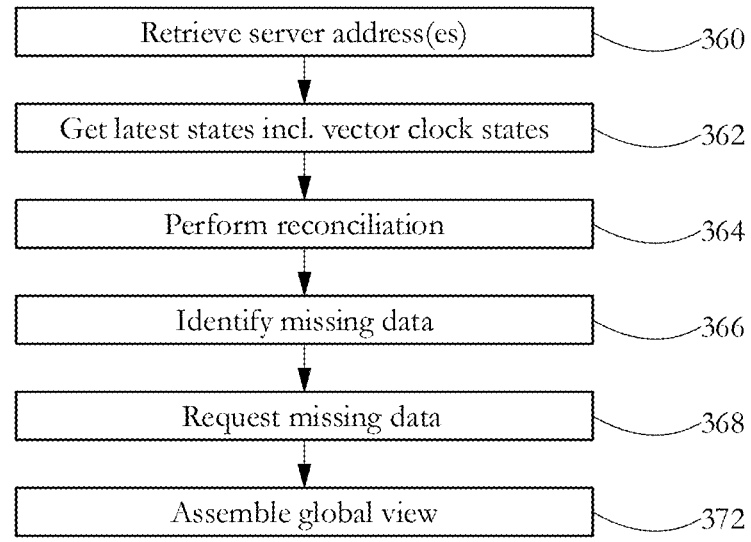
FIG. 10 shows a sequence of steps performed to synchronize a client's state with data from one or more servers according to some embodiments of the present invention.

FIG. 10 shows a sequence of steps performed to synchronize a client's state with data from one or more servers according to some embodiments of the present invention. In a step 360, a client device retrieves from local storage the address(es) of server(s) associated with the device and corresponding user profile.

In a step 362, the client device retrieves the latest user profile state(s) for its user profile from the remote server(s). Each latest user profile state includes a vector clock state. In a step 364, the client reconciles its existing local data and the data retrieved from remote server(s) to generate an updated user profile state. For example, retrieved vector clock data may include different (e.g. higher) scalar values for other devices of the user profile, for example if the other devices have performed actions (e.g. posted messages) that are not reflected in the local device's state. Reconciliation includes determining an updated vector clock state incorporating reconciled local and remote vector clock values. Other fields (e.g. user name, description, feed messages, etc.) are reconciled as well. Following reconciliation, the reconciled state may be returned to the remote server(s).

In a step 366, the local device identifies data that is missing for its local user profile state. For example, retrieved vector clock scalar values for other devices may indicate that other user profile devices have posted messages or performed other actions whose data is not included in the local device's user profile state. In a step 368, the identified missing data (e.g. missing posts) are requested from the remote server(s), and incorporate in the user profile state stored by the local device. In a step 372, a user profile view such as those illustrated in FIGS. 6-F and 6-H is generated using the updated user profile state.

The exemplary embodiments described above allow creating and distributing content in a censorship-resistant manner, using a decentralized social network controlled primarily by its users, rather than by a host platform. Users may host their content on any available server(s), and port their content to different servers seamlessly. Users may post and consume content on multiple devices tied to a user profile, even when some devices are offline. The system restores consistency between devices when devices return online.

The use of vector clocks as described above facilitates maintaining consistency between different devices of a profile, even when some devices may be used offline to compose/post and/or read content for certain periods.

In some embodiments, Lamport timestamps may be used instead of vector clocks. A system using Lamport timestamps may be less effective at verifying feed integrity and restoring missing content when some devices go offline. For example, if a device's Lamport counter goes from 100 to 150 because other devices have posted intervening messages, the Lamport counter of 150 tells the device that there are intervening messages posted by other devices, but does not identify which devices have posted which messages.

Vector clocks allow better integrity checking and retrieval of missing information, which makes the distributed social network more robust, particularly in the presence of malicious behavior and/or mixed offline/online activity. For example, if one offline device posts 100 messages (numbered 1-100) and another offline device of the same user profile posts another 100 messages (also numbered 1-100), when the devices come online the two feeds can be integrated seamlessly through the normal synchronization processes performed by the system clients and servers. Furthermore, if a malicious server were to hide messages posted by a user profile, the presence of the messages may be revealed by other servers.

The locally-controlled cryptographic identity management and distributed web of trust described above also allow addressing malicious behavior in the absence of a single trusted authority. Each user profile's signed messages can be authenticated by a member of the public using the user profile's public key. Furthermore, authentic, non-malicious users can use the distributed web of trust to eventually amplify content posted by other non-malicious users, and limit the spread of content posted by malicious and/or automated user profiles (bots).

It will be clear to one skilled in the art that the above embodiments may be altered in many ways without departing from the scope of the invention. Accordingly, the scope of the invention should be determined by the following claims and their legal equivalents.

What is claimed is:

1. A method comprising employing at least one hardware processor of a computer system to:
   receive a first social network message from a first device in a decentralized social network, the first message including
   a first user profile identifier identifying a public key of a public/private key pair of a first user profile, the first device being assigned to the first user profile,
   a first device identifier identifying the first device,
   a first content payload including social networking post content,
   a vector clock state for the first user profile, the vector clock state comprising a plurality of scalar values, each scalar value characterizing a device assigned to the first user profile, and a message signature generated by signing the first message using a private key of the public/private key pair of the first user profile;
   assemble a second social network message for posting on the decentralized social network, wherein the second social network message includes
   a second user profile identifier identifying a public key of a public/private key pair of a second user profile, the computer system being assigned to the second user profile,
   a second device identifier identifying the computer system,
   a second content payload including social networking post content,
   a vector clock state for the second user profile, the vector clock state comprising a plurality of scalar values, each scalar value characterizing a device assigned to the second user profile, and a message signature generated by signing the second message using a private key of the public/private key pair of the second user profile;
   receive user input identifying a distribution server for the second user profile; and
   add the identified distribution server to a set of existing distribution servers for the second user profile.

2. The method of claim 1, further comprising employing the at least one hardware processor of the computer system to:
   receive user input identifying a replacement distribution server for the second user profile, and replace an existing distribution server for the second user profile with the identified replacement distribution server.

3. The method of claim 1, further comprising employing the at least one hardware processor of the computer system to transmit the second social network message for distribution to multiple independently-controlled servers having different domain names.

4. The method of claim 1, further comprising employing the at least one hardware processor of the computer system to update a vector clock state for the first user profile maintained by the computer system according to the vector clock state for the first user profile received in the first message.

5. The method of claim 1, further comprising employing the at least one hardware processor of the computer system to receive a third social network message from another device assigned to the second user profile in the decentralized social network, the third social network message including:
   the second user profile identifier identifying the public key of the public/private key pair of the second user profile,
   a third device identifier identifying the another device assigned to the second user profile, a third content payload including social networking post content,
   another vector clock state for the second user profile, comprising a plurality of scalar values each characterizing a device assigned to the second user profile, and
   a message signature generated by signing the third message using the private key of the public/private key pair of the second user profile.

6. The method of claim 5, further comprising employing the at least one hardware processor of the computer system to:
   use the another vector clock state for the second user profile received in the third message to identify a missing message belonging to the second user profile; and
   in response, request the missing message from a server distributing messages belonging to the second user profile.

7. The method of claim 1, further comprising employing the at least one hardware processor of the computer system to:
   use the vector clock state for the first user profile received in the first message to identify a missing message belonging to the first user profile;
   in response, look up a server distributing messages belonging to the first user profile; and
   in response, request the missing message from the server distributing messages belonging to the first user profile.

8. The method of claim 1, wherein the first message further includes a real time timestamp, and the method further comprises employing the at least one hardware processor of the computer system to order a display of received social network messages belonging to the first user profile according to the real time timestamp.

9. The method of claim 1, wherein the display of received social network messages belonging to the first user profile comprises displays of messages generated by multiple devices belonging to the first user profile, and ordered in the display according to real time timestamps of the messages generated by multiple devices.

10. The method of claim 1, further comprising employing the at least one hardware processor of the computer system to maintain a local instance of a conflict-free replicated data type (CRDT) storing at least one field of the second message.

11. The method of claim 1, further comprising employing the at least one hardware processor of the computer system to formulate a query message for performing a search for content across multiple distributed social network user profiles.

12. The method of claim 1, further comprising employing the at least one hardware processor of the computer system to initiate a user profile creation sequence comprising:
   receiving user input selecting a distributed social network handle for the second user profile;
   receiving user input selecting a server for distributing social network messages belonging to the second user profile; and
   storing the public/private key pair for the second user profile, the public/private key pair for the second user profile being generated during the user profile creation sequence.

13. The method of claim 1, further comprising employing the at least one hardware processor of the computer system to receive an identifier of the first user profile as a trusted user profile of the distributed social network, the identifier of the first user profile as a trusted user profile of the distributed social network being issued by a first entity belonging to the distributed social network.

14. The method of claim 13, further comprising employing the at least one hardware processor of the computer system to receive an identifier of the first entity as a trusted entity of the distributed social network, the identifier of the first entity as a trusted entity of the distributed social network being issued by a second entity belonging to the distributed social network.

15. A computer system having at least one hardware processor and a memory programmed to:
   receive a first social network message from a first device in a decentralized social network, the first message including
   a first user profile identifier identifying a public key of a public/private key pair of a first user profile, the first device being assigned to the first user profile,
   a first device identifier identifying the first device,
   a first content payload including social networking post content,
   a vector clock state for the first user profile, the vector clock state comprising a plurality of scalar values, each scalar value characterizing a device assigned to the first user profile, and a message signature generated by signing the first message using a private key of the public/private key pair of the first user profile;
   assemble a second social network message for posting on the decentralized social network, wherein the second social network message includes
   a second user profile identifier identifying a public key of a public/private key pair of a second user profile, the computer system being assigned to the second user profile,
   a second device identifier identifying the computer system,
   a second content payload including social networking post content,
   a vector clock state for the second user profile, the vector clock state comprising a plurality of scalar values, each scalar value characterizing a device assigned to the second user profile, and a message signature generated by signing the second message using a private key of the public/private key pair of the second user profile;
   receive user input identifying a distribution server for the second user profile; and
   add the identified distribution server to a set of existing distribution servers for the second user profile.

16. A non-transitory computer-readable medium storing instructions which, when executed by at least one hardware processor of a computer system, cause the computer system to:
  receive a first social network message from a first device in a decentralized social network, the first message including
    a first user profile identifier identifying a public key of a public/private key pair of a first user profile, the first device being assigned to the first user profile,
    a first device identifier identifying the first device,
    a first content payload including social networking post content,
    a vector clock state for the first user profile, the vector clock state comprising a plurality of scalar values, each scalar value characterizing a device assigned to the first user profile, and a message signature generated by signing the first message using a private key of the public/private key pair of the first user profile;
  assemble a second social network message for posting on the decentralized social network, wherein the second social network message includes
    a second user profile identifier identifying a public key of a public/private key pair of a second user profile, the computer system being assigned to the second user profile,
    a second device identifier identifying the computer system,
    a second content payload including social networking post content,
    a vector clock state for the second user profile, the vector clock state comprising a plurality of scalar values, each scalar value characterizing a device assigned to the second user profile, and a message signature generated by signing the second message using a private key of the public/private key pair of the second user profile; and
  receive user input identifying a distribution server for the second user profile; and
  add the identified distribution server to a set of existing distribution servers for the second user profile.

* * * * *